United States Patent [19]

Zones

[11] Patent Number: 4,676,958
[45] Date of Patent: Jun. 30, 1987

[54] PREPARATION OF CRYSTALLINE ZEOLITES USING MAGADIITE

[75] Inventor: Stacey I. Zones, San Francisco, Calif.

[73] Assignee: Chevron Research Company, San Francisco, Calif.

[21] Appl. No.: 708,759

[22] Filed: Mar. 6, 1985

[51] Int. Cl.$^4$ .............................................. C01B 33/28
[52] U.S. Cl. .................... 423/118; 423/329; 423/328
[58] Field of Search ............... 423/118, 328 T, 328 Z, 423/329 T

[56] References Cited

U.S. PATENT DOCUMENTS

| Re. 29,857 | 12/1978 | Argauer et al. ............... 208/120 |
| 3,306,922 | 2/1967 | Barrer et al. .................. 423/328 T |
| 3,947,482 | 3/1976 | Albers et al. ................. 423/328 T |
| 4,100,262 | 7/1978 | Pelrine ........................ 423/328 T |
| 4,410,637 | 10/1983 | Kortbeek et al. ............. 502/257 |
| 4,531,012 | 7/1985 | Valyocsik .................... 423/328 T |
| 4,626,421 | 12/1986 | Zones .......................... 423/329 T |
| 4,627,968 | 12/1986 | Kai .............................. 423/329 T |

FOREIGN PATENT DOCUMENTS

| 5152998 | 11/1974 | Japan ........................... 423/118 |
| 0023497 | 8/1983 | United Kingdom . |
| 2125390 | 3/1984 | United Kingdom . |

Primary Examiner—John Doll
Assistant Examiner—Lance Johnson
Attorney, Agent, or Firm—S. R. LaPaglia; T. G. DeJonghe; V. J. Cavalieri

[57] ABSTRACT

Zeolites are prepared using magadiite as a source of silica.

10 Claims, No Drawings

PREPARATION OF CRYSTALLINE ZEOLITES USING MAGADIITE

BACKGROUND OF THE INVENTION

1. Field of the Invention

This invention relates to a method for synthesizing crystalline zeolites requiring a reaction mixture for crystallization thereof which contains magadiite as a source of silicon oxide.

2. Description of the Prior Art

Natural and synthetic zeolitic materials of the molecular sieve type are known and are staple items of commerce. Crystalline zeolites are extremely well known in the art and have been the subject of much attention in both the patent and technical literature. These materials have been demonstrated to have catalytic properties for various types of hydrocarbon conversions.

Because of their unique molecular sieving characteristics, as well as their potentially acidic nature, zeolites are especially useful in hydrocarbon processing as absorbents, and, as catalysts, for cracking, reforming, and other hydrocarbon conversion reactions. Although many different crystalline aluminosilicates have been prepared and tested, the search continues for new zeolites which can be used in hydrocarbon and chemical processing.

Prior art techniques have resulted in the formation of a great variety of synthetic zeolites. A number of these zeolites require the presence of a source of organic nitrogen-containing cations in the reaction mixture used to prepare them. Those zeolites include, for example, zeolite ZSM-5 (U.S. Pat. Nos. 3,702,886 and RE 29,948), zeolite ZSM-11 (U.S. Pat. No. 3,709,979), zeolite ZSM-12 (U.S. Pat. No. 3,832,449), zeolite ZSM-23 (U.S. Pat. No. 4,076,842), zeolite ZSM-35 (U.S. Pat. No. 4,016,245), zeolite ZSM-38 (U.S. Pat. No. 4,046,859), zeolite ZK-4 (U.S. Pat. No. 3,314,752), zeolite ZK-22 (U.S. Pat. No. 3,791,964), zeolite "alpha" (U.S. Pat. No. 3,375,205), zeolite "beta" (U.S. Pat. No. 3,308,069), a synthetic erionite (U.S. Pat. No. 3,699,139) and a synthetic offretite (U.S. Pat. No. 3,578,398). A method for synthesizing ZSM-5, ZSM-12, ZSM-35 AND ZSM-38 is disclosed in U.S. Pat. No. 4,151,189.

As is set forth in the above-identified U.S. patents which are incorporated totally herein by reference, these types of zeolites are prepared from a forming solution containing water, a source of organic nitrogen-containing cations, an alkali metal, a source of silica, and a source of alumina. As is known in the art, the forming solution is held at elevated temperatures and pressures until the crystals are formed and thereafter the zeolite crystals are removed.

Prior art sources of silica in preparing zeolites include sodium silicate, colloidal silica, silica hydrosol, silica gel and silicic acid.

A considerable amount of effort has been made to find cheaper routes to zeolites, to find ways to prepare purer forms of the zeolites, and to find ways to prepare zeolites having larger crystal sizes and more ordered crystal structures.

It has now been found that magadiite in its alkali metal form or in the hydrogen form, especially when made synthetically, is a particularly attractive source of silica as it enables useful zeolites to be prepared cheaply, easily and in a purer, larger and more ordered form.

SUMMARY OF THE INVENTION

The present invention is directed to a method of preparing a crystalline zeolite which comprises preparing a reaction mixture containing as a source of silica oxide, magadiite or the hydrogen form of magadiite, a source of aluminum or gallium, an alkali metal oxide, a quaternary organic ammonium cation and water and having a composition, in terms of mole ratios of oxides, falling within the following ranges:

| | | |
|---|---|---|
| $M^+/SiO_2$ | = | 0.01–0.50 |
| $OH^-/SiO_2$ | = | 0.01–0.30 |
| $H_2O/SiO_2$ | = | 20–120 |
| $Q/SiO_2$ | = | 0.10–1.00 |
| $SiO_2/Y_2O_3$ | = | greater than 15 | wherein Q is a quaternary organic ammonium cation, $M^+$ is an alkali metal ion not supplied by the magadiite, and $Y_2O_3$ is aluminum or gallium oxide, and maintaining said mixture at crystallization temperature until said crystals are formed.

DETAILED DESCRIPTION

Magadiite is a natural or synthetic sodium silicate hydrate with a layered structure having a composition approximating to $Na_2Si_{14}O_{29}.11H_2O$. Natural magadiite may be obtained from lake beds at Lake Magadi, Kenya or has an X-ray diffraction pattern as described by Eugster, H. P., Hydrous Sodium Silicates from Lake Magadi, Kenya; Precursors of Bedded Chert., Science, 157, 1177–1180 (1967) which is incorporated herein by reference. Synthetic magadiite is prepared from methods known in the art, for example Logaly, G. and Beneke, K., American Mineralogist, 60, 642–649, 1975, as well as by a novel method described hereinbelow. The hydrogen form of magadiite may be prepared by methods described by Logaly, G. and Beneke, K., American Mineralogist, 60 650–658, 1975.

A preferred method of preparing synthetic magadiite which is aluminum free comprises preparing a mixture containing an alkali metal hydroxide, a source of silica dioxide, water and as a promoter, a lower alkyl substituted urea or a lower alkyl substituted amide and mixtures thereof and having a composition in terms of mole ratios of oxides falling within the following ranges:

| | Broad | Narrow |
|---|---|---|
| $OH^-/SiO_2$ = | 0.25 to 0.80 | 0.55 to 0.65 |
| promoter/$SiO_2$ = | 0.05 to 0.50 | 0.1 to 0.20 |
| $H_2O/SiO_2$ = | at least 30:1 | | and maintaining said mixture under crystallization conditions until crystals of said magadiite are formed.

Typical silicon oxide sources in preparing magadiite include silicates, silica hydrogel, silica acid, colloidal silica, etc. The sodium hydroxide is the preferred alkali metal hydroxide. Temperatures for the process range from about 100° C. to about 175° C. and preferably 130° C. to 160° C., and crystallization times range from about 50 to 150 hours. Preferably, the hydrothermal crystallization is performed under pressure in an autoclave or static bomb reactor so that the reaction mixture is subject to autogenous pressure. The alkali metal form of magadiite, e.g., Na-magadiite may be converted to H-magadiite by treating the Na-magadiite with an acidic material such as aqueous hydrochloric acid.

Prior art synthetic methods, without the presence of the lower alkyl substituted urea or lower alkyl substituted amide promoters, would take considerably longer to obtain crystalline product.

Preferably, the lower alkyl substituted urea has the formula:

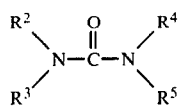

where $R^2$ and $R^3$ are the same of different and each is H, lower alkyl of 1 to 5 carbon atoms or $R^2$ and $R^3$ together with the nitrogen to which they are attached form an alkylene group containing 4 to 7 carbon atoms which may be interrupted by O, S or N atoms; $R^4$ and $R^5$ are the same or different and each is H, lower alkyl or 1 to 5 carbon atoms or $R^4$ and $R^5$ together with the nitrogen to which they are attached form an alkylene group containing 4 to 7 carbon atoms which may be interrupted by an O, S or N atom, with the proviso that $R^2$, $R^3$, $R^4$ and $R^5$ cannot all be hydrogen at the same time; and the lower alkyl substituted amide has the formula:

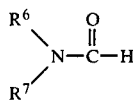

wherein $R^6$ and $R^7$ are H or lower alkyl containing 1 to 5 carbon atoms or $R^6$ and $R^7$ together with the nitrogen to which they are attached form an alkylene group containing 4 to 7 carbon atoms which may be interrupted by an O, S. or N atom with the proviso that $R^6$ and $R^7$ cannot be hydrogen at the same time.

Particularly preferred crystalline zeolites which can be prepared in accordance with the present invention are those of the ZSM-5 type and various other materials. ZSM-5 type zeolites are exemplified by ZSM-5, ZSM-12, ZSM-35, ZSM-39, and ZSM-48 and other similar materials. U.S. Pat. No. 3,702,886 describes and claims ZSM-5.

ZSM-11 is more particularly described in U.S. Pat. No. 3,709,979.

ZSM-12 is more particularly described in U.S. Pat. No. 3,832,449.

ZSM-35 is more particularly described in U.S. Pat. Nos. 4,016,245 and 4,017,195.

ZSM-39 is more particularly described in U.S. Pat. No. 4,259,306.

ZSM-48 is more particularly described in U.S. Pat. Nos. 4,375,573 and 4,423,021.

Other crystalline zeolites prepared in accordance to the present invention are the EU-2 (Great Britain No. 2,077,709A), FU-1 (U.S. Pat. No. 4,209,498) and SSZ-15 (copending U.S. application Ser. No. 437,709) type. Each of the above-identified patents and applications are incorporated herein by reference. New zeolite structures may result as well by the present method.

It is to be understood that by incorporating by reference the foregoing patents to describe examples of specific members of the zeolites with greater particularity, it is intended that identification of the therein disclosed crystalline zeolites be resolved on the basis of their respective X-ray diffraction patterns. As discussed above, the present invention contemplates preparation of such catalysts wherein the mole ratio of aluminum to silica may be higher than disclosed in the patents. The incorporation of the identified patents should therefore not be construed as limiting the disclosed crystalline zeolites to those having the specific alumina-silica mole ratios discussed therein. It is the crystal structure, as identified by the X-ray diffraction "fingerprint", which establishes the identity of the specific crystalline zeolite material.

The use of magadiite as a source of silica in the reaction mixture allows production of high purity crystalline molecular sieves or zeolites. Due to the relatively low solubility of magadiite, the crystalline zeolites form relatively slowly, which allows for crystallite formation of significantly greater dimensions than those obtained using normal or prior art zeolite preparations. Also, the crystals formed generally have a more perfect form with fewer dislocations and crystalline disorder.

The use of magadiite also allows a relatively smaller concentration of alkali metal hydroxide to be present in the reaction mixture. Because one can use lower amounts of alkali metal hydroxide and because magadiite may be used in the hydrogen form as well as the alkali metal form and preferably the sodium form or as mixtures thereof, lower alkali metal containing crystalline zeolites may be obtained.

While not intending to be limited by theory, it is believed that magadiite may contain within its structure the correct pentasil building units found in the framework structure of a number of high silica zeolites. By breaking relatively few bonds in the magadiite structure, and in the presence of quaternary organic ammonium cations, the layered silicate can be converted into a three dimensional zeolite structure.

The zeolite can be suitably prepared from an aqueous solution containing sources of an alkali metal oxide, a quaternary organic ammonium cation, aluminum or gallium, and magadiite or the hydrogen form of magadiite or mixtures thereof. The reaction mixture should have a composition in terms of mole ratios of oxides falling within the following ranges:

|  | Narrow | Broad |
| --- | --- | --- |
| $M^+/SiO_2$ | 0.01–0.10 | 0.01–0.50 |
| $OH^-/SiO_2$ | 0.01–0.05 | 0.01–0.30 |
| $H_2O/SiO_2$ | 30–50 | 20–120 |
| $Q/SiO_2$ | 0.2 to 0.6 | 0.1–1.00 |
| $SiO_2/Y_2O_3$ | greater than 15 | 15–1000 | wherein Q is a quaternary organic ammonium cation, $M^+$ is an alkali metal not supplied by the magadiite, preferably sodium or potassium and $Y_2O_3$ is aluminum or gallium oxide.

The organic component of the crystallization mixture which acts as a template during crystallization and from which Q is derived is an organic quaternary ammonium compound and includes those having the following formulas:

$$R_4N^+X^-$$

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 6 carbon atoms, cycloheteroalkyl of from 3 to 6 carbon atoms or combinations thereof; X is an anion, e.g., fluoride, chloride, bromide, iodide, hydroxide, acetate, sulfate, carboxylate, etc. The anion is one which is not detrimental to formation of the zeolite.

Non-limiting examples of these types of compounds include salts of tetramethylammonium, tetraethylammonium, tetrapropylammonium, tetrabutylammonium, dibenzyldiethylammonium, benzyltrimethylammonium, trimethylcyclopentylammonium, trimethylfurfurylammonium, dimethylethylcyclopentylammonium, ethyltrimethylammonium and chlorine, bromine or iodine, or

R'N+X wherein R' is a hydrocarbon group containing 3 to 10 carabon atoms which is attached to the N+ and forms an alicyclic, heteroalicyclic or heteroaromatic structure and X is as defined above. Such structures may be, as non-limiting examples:

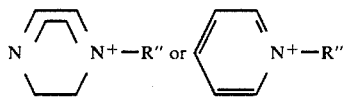

wherein R" is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms;

or compounds containing multiple cationic centers which include those having the formula:

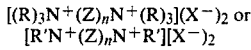

wherein R, R' and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

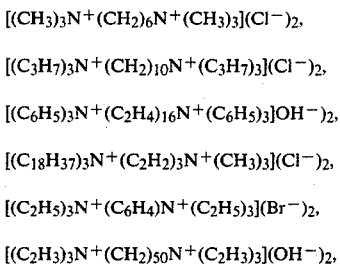

and

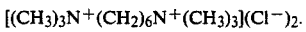

The reaction mixture is prepared using standard zeolitic preparation techniques.

The reaction mixture is maintained at an elevated temperature until the crystals of the zeolite are formed. The temperatures during the hydrothermal crystallization step are typically maintained from about 100° C. to about 250° C., preferably from about 120° C. to about 200° C. and most preferably from about 130° C. to about 165° C. The crystallization period is typically from about 1 to about 7 days.

The hydrothermal crystallization is conducted under pressure and usually in an autoclave so that the reaction mixture is subject to autogenous pressure. The reaction mixture can be stirred during crystallization.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as synthesized, zeolite crystals. The drying step can be performed at atmospheric or subatmospheric pressures.

As in the case of the crystalline zeolites referenced previously, the organic quaternary amine cation moiety is quite readily thermally decomposed and removed from the zeolite by calcination in an oxidizing atmosphere (air) or inert atmosphere at temperatures of from about 480° F. to 1500° F.

The crystalline zeolites obtained by the method of this invention are suitable for use in all the absorption and catalyst applications in which the above-referenced zeolites can be employed.

The synthetic molecular sieve or zeolite in some cases can be used as synthesized or it may have to be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be exchanged into the zeolite. The zeolite can also be impregnated with the metals, or, the metals can be physically intimately admixed with the zeolite using standard methods known to the art. And the metals can be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 480° F. to 1500° F. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The aluminosilicate can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subject to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constitutent is halloysite, kaolinite, dickite, nacrite, or anauxite. Fibrous clays such as sepiolite and attapulgite can also be used as supports. Such clays can be used in the raw state as originally mined or can be calcined, treated with acid, or chemically modified.

In addition to the foregoing materials, the zeolite can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The zeolite can also be composited with other zeolites such as synthetic and natural faujasites (e.g., X and Y), erionites, and mordenites. They can also be composited with purely synthetic zeolites. The combination of zeolites can also be composited in a porous inorganic matrix.

EXAMPLES

Example 1

Preparation of a Synthetic Magadiite

A solution is formed from mixing 6 g of N,N,N'N'tetramethylurea (Burdick and Jackson), 42.14 g of Banco sodium silicate solution (29.22 wt % $SiO_2$, 9.08% $Na_2O$), 0.80 g of concentrated sodium hydroxide solution (50% w/w), and 193 ml of water. There is no gelation or precipitation. The contents are loaded into a Teflon-lined stainless steel cannister or reactor designed to operate under pressure. The cannister or reactor is heated at 140° C. for seven days without agitation. Upon cooling the reactor, the contents are poured into a filter and the precipitated solids are washed several times with water and then air-dried. The product has the X-ray diffraction pattern shown in Table I.

TABLE I

| $2\theta$ | Relative d/n | Int. |
|---|---|---|
| 5.71 | 15.48 | 72 |
| 11.44 | 7.73 | 5 |
| 12.20 | 7.25 | 1 |
| 17.15 | 5.17 | 7 |
| 17.70 | 5.01 | 2 |
| 19.82 | 4.48 | 3 |
| 22.12 | 4.02 | 1 |
| 24.45 | 3.641 | 5 |
| 25.02 | 3.559 | 8 |
| 25.82 | 3.450 | 28 |
| 26.93 | 3.311 | 16 |
| 28.29 | 3.155 | 23 |
| 29.80 | 2.998 | 1 |

Example 2

Using 1.5 g of magadiite prepared according to Example 1, and adding in 15 ml $H_2O$, 0.16 g of $Al_2(SO_4)_3.16 H_2O$, and 0.30 g 50% NaOH, the solid magadiite was slurried in the Teflon liner of a Parr 4749 pressure reactor. Two grams of tetrapropylammonium bromide (identified as Template B in Table III below) were added as the organocation which will specify the zeolite to be formed. The reactor was sealed and heated for 72 hours at 180° C. without agitation. Upon cooling the product is recovered by filtration and dried after several washings. A zeolite was produced which is ZSM-5 by X-ray diffraction. The zeolite contains 2.5% $Al_2O_3$.

Example 3

The same conditions were followed as in Example 2 except only 0.15 g of 50% NaOH is used and 0.16 g of $Ga_2(SO_4)_3.16H_2O$ were used in place of the aluminum source. The product is 100% ZSM-5 by X-ray diffraction and contains the gallium used in the synthesis.

The X-ray powder diffraction patterns for the magadiite of Example 1 and the prepared zeolites were determined using standard techniques. The radiation was K-alpha/doublet of copper and a scintillation counter spectrometer with a strip-chart pen recorder was used. The peak heights I and the positions as a function of $2\theta$, where $\theta$ is the Bragg angle, were read from the spectrometer chart. From these measured values, the relative intensities, 100 $I/I_o$, where $I_o$ is the intensity of the strongest line or peak, and d, the interplanar spacing in Angstroms corresponding to the recorded lines, can be calculated. The X-ray diffraction pattern obtained for the product corresponded with the known pattern for each of the indicated zeolites.

Using the general procedure outlined in Example 2, various zeolites are prepared as shown in Table II.

The templates used in Examples 1 through 12 are specifically described in Table III.

TABLE II

| Example No. | Template | Template g | g. Magadiite | g Al$_2$(SO$_4$)$_3$.16 H$_2$O | Conc. NaOH, g | H$_2$O, ml | Time | Temp. | Phases as Determined by X-ray Analysis |
|---|---|---|---|---|---|---|---|---|---|
| 4 | B | 2.00 | 1.50 | 0.16 | 0.20 | 15 | 3 Days | 200° C. | ZSM-5 |
| 5 | A | 1.33 | 1.03 | 0.16 | 0.13 | 10 | 3 Days | 150° C. | SSZ-15 |
| 6 | E | 2.00 | 1.50 | 0.16 | 0.20 | 15 | 3 Days | 200° C. | ZSM-12 |
| 7 | F | 2.00 | 1.50 | 0.16 | 0.20 | 15 | 3 Days | 200° C. | 60% EU-2 |
| 8 | H | 1.50 | 1.50 | 0.16 | 0.20 | 15 | 3 Days | 180° C. | ZSM-48 |
| 9 | I | 0.51 | 0.50 | 0.16 | 0.08 | 5 | 3 Days | 180° C. | ZSM-12 |
| 10 | D | 2.00 | 1.50 | 0.16 | 0.04 | 15 | 1 Day | 230° C. | ZSM-39 |
| 11 | B | 2.01 | 1.53 | 0.16 | .01 | 14 | 1 Day | 230° C. | ZSM-5 |
| 12 | J | 2.00 | 1.50 | 0.16 | 0.04 | 15 | 1 Day | 230° C. | 20% FU-1 |

TABLE III

Organic Cation

| Designation | Name | Structure |
|---|---|---|
| A | N,N,N, Trimethyl-cyclopentylammonium | ⬠—N$^+$(CH$_3$)$_3$ I$^\ominus$ |
| B | Tetrapropyl-ammonium (TPA) | (CH$_3$CH$_2$CH$_2$)$_4$N$^+$ Br$^\ominus$ |
| E | Bis 1,4 diquinuclidinium butane | 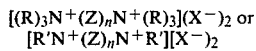 2 Br$^\ominus$ |
| F | Hexamethonium | (CH$_3$)$_3$N$^+$—(CH$_2$)$_6$—N$^+$(CH$_3$)$_3$ 2 Br$^\ominus$ |
| H | N,N,N Trimethyl-furfurylammonium | ⬠—CH$_2$—N$^+$(CH$_3$)$_3$ I$^\ominus$ (with CH$_3$ groups) |
| I | N,N,N Dimethyl, ethyl-cyclopentylammonium | ⬠—N$^+$(CH$_3$)$_2$(CH$_2$CH$_3$) I$^\ominus$ |
| J | Ethyl tri-methylammonium | CH$_3$CH$_2$—N$^+$(CH$_3$)$_3$ I$^\ominus$ |

What is claimed is:

1. A method of preparing crystalline zeolites which comprises preparing a reaction mixture containing magadiite or the hydrogen form of magadiite as a source of silica, a source of aluminum or gallium, an alkali metal oxide, a quaternary organic ammonium cation and water and having a composition, in terms of mole ratios of oxides, falling within the following ranges:

| | | |
|---|---|---|
| M$^+$/SiO$_2$ | = | 0.01–0.50 |
| OH$^-$/SiO$_2$ | = | 0.01–0.30 |
| H$_2$O/SiO$_2$ | = | 20–120 |
| Q/SiO$_2$ | = | 0.10–1.00 |
| SiO$_2$/Y$_2$O$_3$ | = | greater than 15 | wherein Q is a quaternary organic ammonium cation, and M$^+$ is an alkali metal ion not supplied by the magadiite and Y$_2$O$_3$ is aluminum or gallium oxide, and maintaining said mixture at crystallization temperature until said crystals are formed.

2. The method of claim 1 which contains an additional step of calcining the crystalline organosilicate formed at a temperature of from 480° F. to 1500° F.

3. The method of claim 1 wherein the temperature is maintained between about 100° C. to 250° C.

4. The method of claim 1 wherein M is sodium.

5. The method of claim 1 wherein the quaternary organic ammonium cation is derived from compounds having the formula:

$$R_4N^+X^-$$

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 6 carbon atoms, cycloheteroalkyl of from 3 to 6 carbon atoms or combinations thereof; and X is an anion.

6. The method of claim 1 wherein the quaternary organic ammonium cation is derived from compounds having the formula:

$$R'N^+X^-$$

wherein R' is a hydrocarbon group containing 3 to 10 carbon atoms which is attached to the N$^+$ and forms an alicyclic, heterocyclic or heteroaromatic structure; and X is an anion.

7. The method of claim 1 wherein the quaternary organic ammonium cation is derived from compounds having the formula:

$$[(R)_3N^+(Z)_nN^+(R)_3](X^-)_2 \text{ or}$$
$$[R'N^+(Z)_nN^+R'][X^-]_2$$

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 6 carbon atoms, cycloheteroalkyl of from 3 to 6 carbon atoms; R' is a hydrocarbon group containing 3 to 10 carbon atoms which is attached to the N$^+$ and forms an alicyclic, heterocyclic or heteroaromatic structure; X is an anion; Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50.

8. The method of claim 1 wherein the magadiite is prepared by a method which comprises preparing a mixture containing an alkali metal hydroxide, a source of silica dioxide, water and as a promoter, a lower alkyl substituted urea or a lower dialkyl substituted amide or mixtures thereof and having a composition in terms of mole ratios of oxides falling within the following ranges:

| | |
|---|---|
| OH⁻/SiO$_2$ = | 0.25 to 0.8 |
| promoter/SiO$_2$ = | 0.05 to 0.5 |
| H$_2$O/SiO$_2$ = | at least 30:1 | and maintaining said mixture under crystallization conditions until crystals of said magadiite are formed.

9. The method of claim 8 wherein the lower alkyl substituted urea has the formula:

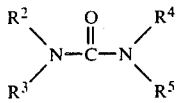

wherein $R^2$ and $R^3$ are the same or different and each is H, lower alkyl of 1 to 5 carbon atoms or $R^2$ and $R^3$ together with the nitrogen to which they are attached form an alkylene group containing 4 to 7 carbon atoms which may be interrupted by O, S or N atoms; $R^4$ and $R^5$ are the same or different and each is H, lower alkyl of 1 to 5 carbon atoms or $R^4$ and $R^5$ together with the nitrogen to which they are attached form an alkylene group containing 4 to 7 carbon atoms which may be interrupted by an O, S or N atom, with the proviso that $R^2$, $R^3$, $R^4$ and $R^5$ cannot all be hydrogen at the same time.

10. The method of claim 8 wherein the lower alkyl substituted amide has the formula:

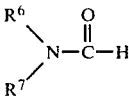

wherein $R^6$ and $R^7$ is N or lower alkyl containing 1 to 5 carbon atoms or $R^6$ or $R^7$ together with the nitrogen to which they are attached form an alkylene group containing 4 to 7 carbon atoms which may be interrupted by an O, S or N atom, with the proviso that $R^6$ and $R^7$ cannot be hydrogen at the same time.

* * * * *